United States Patent
Bell

(10) Patent No.: US 11,273,800 B2
(45) Date of Patent: Mar. 15, 2022

(54) VEHICLE UNDERBODY RINSER

(71) Applicant: Scott R. Bell, Menomonee, WI (US)

(72) Inventor: Scott R. Bell, Menomonee, WI (US)

(*) Notice: Subject to any disclaimer, the term of this patent is extended or adjusted under 35 U.S.C. 154(b) by 179 days.

(21) Appl. No.: 16/239,374

(22) Filed: Jan. 3, 2019

(65) Prior Publication Data
US 2020/0216040 A1    Jul. 9, 2020

(51) Int. Cl.
*B05B 9/00*    (2006.01)
*B60S 3/04*    (2006.01)

(52) U.S. Cl.
CPC ............. *B60S 3/044* (2013.01); *B05B 9/007* (2013.01)

(58) Field of Classification Search
CPC .. B60S 3/044; B60S 3/042; B60S 1/00; B60S 3/00; B60S 3/04; B05B 9/007; B05B 1/20; B05B 3/18; B05B 13/005; B05B 13/04; B05B 15/60; B05B 15/625; B05B 15/658; B05B 1/202; B05B 1/205; B05B 12/34; B08B 3/026; B08B 3/024; B08B 3/028; B08B 3/02; B08B 9/0321; A01G 25/09; A01M 7/0035; A01M 7/0082; A47L 11/4072; B60B 33/0018; B60B 33/0063
USPC .................................................. 239/722–754
See application file for complete search history.

(56) References Cited

U.S. PATENT DOCUMENTS

| | | | |
|---|---|---|---|
| 3,535,822 A * | 10/1970 | Fruth | A01M 21/043 47/1.5 |
| 4,095,746 A | 6/1978 | Anderberg et al. | |
| 4,580,726 A | 4/1986 | Unger | |
| 5,653,392 A | 8/1997 | Wells | |
| 5,707,014 A | 1/1998 | Chan et al. | |
| 6,079,640 A | 6/2000 | Merritts | |
| 6,131,831 A | 10/2000 | Lawrence | |
| 7,208,051 B2 | 4/2007 | Kinski et al. | |
| 9,533,320 B1 | 1/2017 | Koshnick | |
| 2005/0205116 A1* | 9/2005 | Zinski | B05B 9/007 134/34 |
| 2016/0152296 A1* | 6/2016 | Eckert | B62K 3/002 280/87.041 |
| 2016/0200293 A1* | 7/2016 | McKeen | B60S 3/044 239/722 |
| 2017/0166006 A1* | 6/2017 | Willis | B60B 33/0057 |

* cited by examiner

*Primary Examiner* — Darren W Gorman
*Assistant Examiner* — Juan C Barrera
(74) *Attorney, Agent, or Firm* — Wozny IP Law; Thomas M. Wozny

(57) ABSTRACT

A water rinsing apparatus is disclosed for spraying water upwardly against the underbody of a vehicle to rinse and clean the surfaces thereof. The water rinsing apparatus includes a water delivery tube connectable at its inlet end to a garden hose, and at its outlet end to a manifold which distributes water to a plurality of upwardly directed water spray nozzles mounted in the body of the manifold. Wheels are rotatably mounted on fixed axle members projecting longitudinally from opposite sides of the body of the manifold, and provide maneuverability for the apparatus.

10 Claims, 3 Drawing Sheets

VEHICLE UNDERBODY RINSER

BACKGROUND OF THE INVENTION

The present invention relates to water spraying devices, and more specifically to such a device for spraying water to rinse the underbody of a vehicle.

Vehicles will accumulate debris such as dirt, road salt, chemicals and other types of corrosive materials on their underbodies as a result of driving on roads. Over time, such debris may result in corrosion or damage to various components of the vehicle. Therefore, it is desirable to periodically clean the underbody of a vehicle to remove such undesirable debris, and thereby avoid costly repairs.

Retail washing facilities, such as roadside car washes and truck washes, are available to provide for the cleaning of vehicles. However, such facilities are relatively expensive, especially if one desires to clean a vehicle on a regular basis. Also, such facilities are not always convenient for vehicle owners due to their limited number, and sometimes remote, locations. Further, such retail washing facilities are not always available to many commercial vehicles and municipal owner vehicles, such as fire trucks, dump trucks, garbage trucks, ambulances, all-terrain vehicles (ATVs), recreational vehicles (RVs), and the like due to their size or local municipal regulations.

In view of such issues, a device for rinsing and cleaning debris from the underbody of a vehicle is desired. Preferably, such a device should be portable, lightweight, relatively inexpensive, effective, easy to use, and connectable to a conventional water source such as a garden hose spigot of a residential dwelling or other building.

SUMMARY OF THE INVENTION

The present invention provides a water rinsing apparatus for spraying water upwardly against the underbody of a vehicle to rinse and clean the surfaces thereof. The water rinsing apparatus includes a water delivery tube connectable at its inlet end to a garden hose, and at its outlet end to a manifold which distributes water to a plurality of upwardly directed water spray nozzles mounted in the body of the manifold. Wheels are rotatably mounted on fixed axle members projecting longitudinally from opposite sides of the body of the manifold, and provide maneuverability for the apparatus.

The body of the manifold extends longitudinally in a generally normal or crosswise direction with respect to the outlet end of the water delivery tube, and is preferably in the shape of a cylinder. A longitudinal bore is formed in the body of the manifold, and extends entirely therethrough and opens to both of the opposite sides of the body. The longitudinal bore is in fluid communication with the water delivery tube as well as with a plurality of spray nozzles which direct water upwardly against the underbody of a vehicle. The fixed axle members are mounted to the body of the manifold to not only provide a bearing surface for the wheels but also to provide for closing or sealing the opposite open ends of the longitudinal bore so that water from the water delivery tube which enters the longitudinal bore is forced to flow upwardly and through the spray nozzles.

The present invention is thus not only portable, lightweight and relatively inexpensive, but also is effective and easy to use. This apparatus eliminates the cumbersome chore of trying to rinse and clean the underbody of a vehicle.

DETAILED DESCRIPTION OF THE INVENTION

Figure 1:
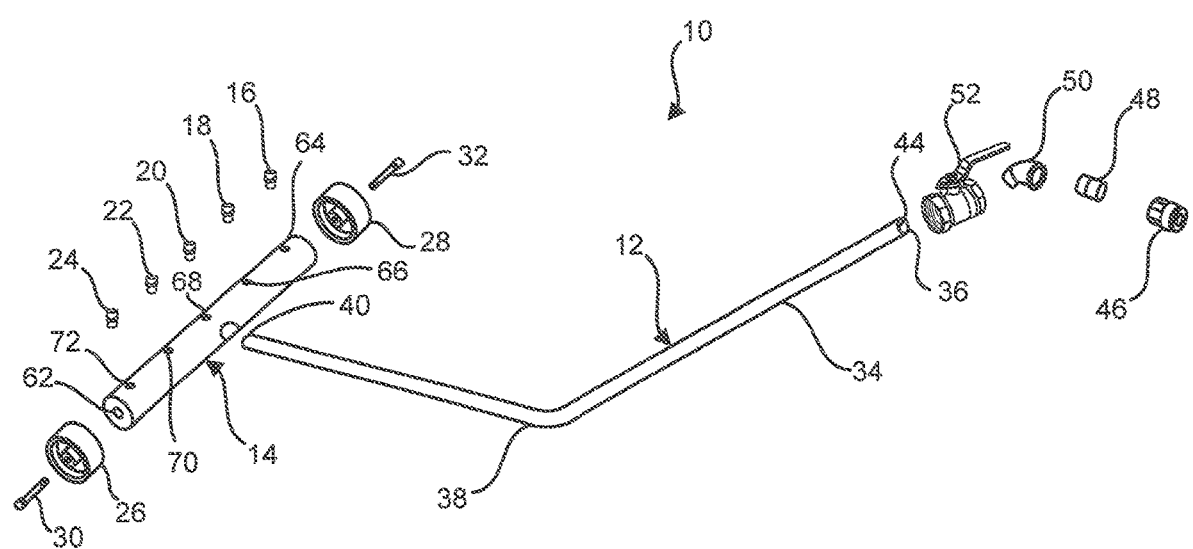
FIG. 1 is an exploded perspective view of a water rinsing apparatus constructed in accordance with the present invention.

Referring now to FIGS. 1-5, a water rinsing apparatus is illustrated, generally designated by the numeral 10, for spraying water against the underbody of a vehicle, such as a car, sport utility vehicle, truck, ambulance, fire truck, dump truck, garbage truck, all-terrain vehicles (ATVs), recreational vehicles (RVs), and the like. The water rinsing apparatus 10 includes a water delivery tube 12 connectable to a garden hose (not shown) at one end, a manifold 14 connected to the other end of tube 12 for distributing water to a plurality of water spray nozzles 16, 18, 20, 22 and 24, and a pair of wheels 26 and 28 rotatably mounted on axle members 30 and 32, respectively, to provide maneuverability for apparatus 10.

Figure 2:
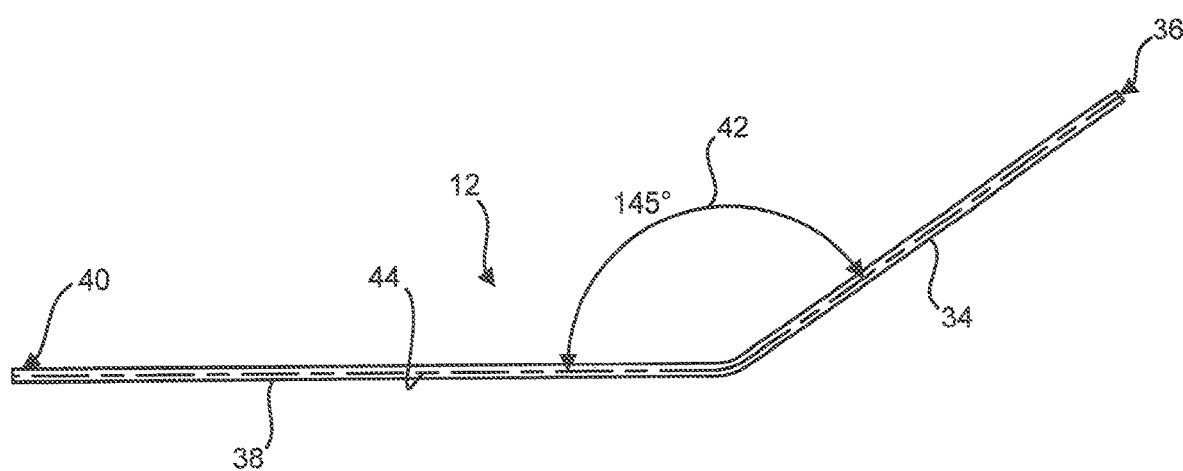
FIG. 2 is a side view of the water delivery tube of the water rinsing apparatus.

The water delivery tube 12 comprises a longitudinally extending angular segment 34 terminating at a water inlet end 36, and a generally horizontal segment 38 terminating at a water outlet end 40. The overall length of tube 12 is about 75 inches to about 80 inches long, preferably about 78 inches long for ease of use, and with segment 38 being longer (about 48 inches) than segment 34 (about 30 inches) to ensure segment 38 can extend beneath a vehicle's underbody a sufficient distance so as to rinse at least about one-half the width of the vehicle. Again, for ease of use, segment 34 is disposed at an obtuse angle 42 with respect to segment 38 so that a user can readily grasp inlet end 36 and stand upright during use of apparatus 10. The obtuse angle 42 is preferably between about 140 degrees to about 150 degrees, but is most preferably about 145 degrees as indicated in FIG. 2.

Water delivery tube 12 may be composed of iron, steel, stainless steel, aluminum, polyvinylchloride (PVC), or any other suitable material, and is preferably a 0.5 inch nominal steel pipe that defines a central water conveying passageway 44 running its entire length from inlet end 36 to its outlet end 40. Tube 12 may preferably be of a one-piece construction, as illustrated in FIGS. 1 and 2 bent to provide the obtuse angle 42 between segments 34 and 38, or of a two-piece construction with segment 34 connected to segment 38 via an appropriate pipe elbow fitting.

As shown in FIG. 1, a standard garden hose connector 46 is located at the water inlet end 36 of delivery tube 12. Connector 46 is a conventional 0.5 inch NPT female to 0.75 inch female threaded hose adapter that enables a standard garden hose (not shown) to be connected to one end. Connector's other end threadedly receives one side of a 0.5 inch close nipple fitting 48 which in turn has its other side threadedly connected to the female end of a 45 degree 0.5 inch street elbow fitting 50. The male end of elbow 50 in turn is threaded into the housing of a conventional 0.5 inch one quarter turn ball valve 52 which in turn is threaded onto the inlet end 36 of tube 12. Valve 52 is thus located between the water inlet end 36 of tube 12 and the garden hose connector 46 to control 6 the flow of water into the water conveying passageway 44 of tube 12.

Figure 3:
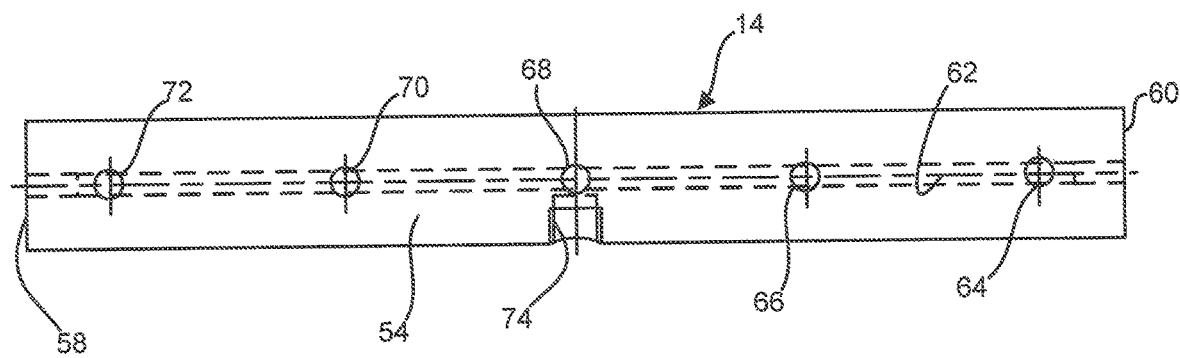
FIG. 3 is a top plan view of the manifold of the water rinsing apparatus.
Figure 4:
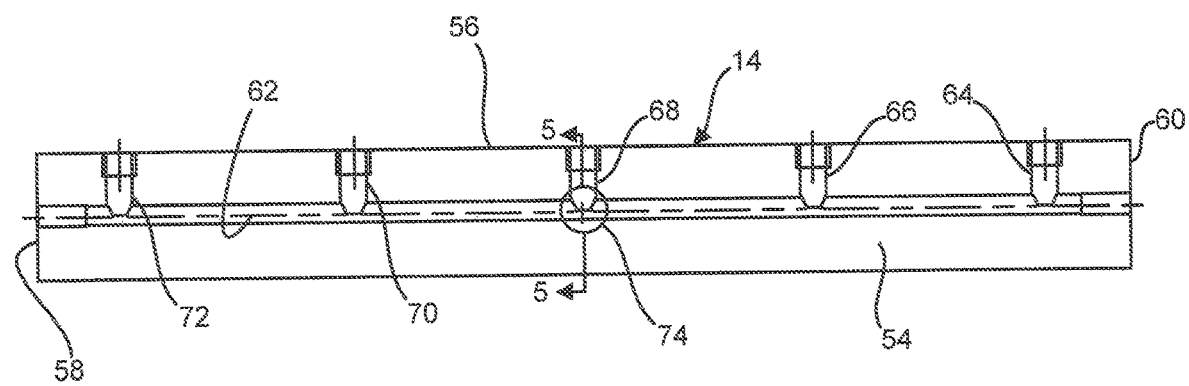
FIG. 4 is a rear view of the manifold illustrated in FIG. 3.

Manifold 14 is connected to the outlet end 40 of the water delivery tube 12, and extends longitudinally in a generally normal or crosswise direction with respect to horizontal segment 38 of tube 12. As shown in FIGS. 3 and 4, manifold 14 comprises a longitudinal body 54 having an upper surface 56 extending between opposite left and right planar sides 58 and 60. Preferably, body 54 is in the shape of a cylinder, and sides 58 and 60 are the opposite bases of the cylinder. However, body 54 may be other shapes, such as oval, rectangular, hexagonal or the like, as long as it accomplishes its function of distributing water from the water conveying passageway 44 of tube 12 therethrough to spray water upwardly against the underbody of a vehicle.

For ease of manufacturing, and to reduce the overall cost of producing manifold 14, and thereby also that of apparatus 190, body 54 of manifold 14 has a longitudinal bore 62 formed therethrough extending its entire length, and opening to both of the opposite sides 58 and 60. When body 54 is a cylinder, bore 62 is located centrally therein and extends along the body's longitudinal axis. Although water conveying passageway 44 of tube 12 has a diameter of 0.5 inch, bore 62 has a diameter of 0.25 inch. This reduction in diameter increases the pressure of the water as it enters bore 62 from passageway 44 to aid in the spraying process.

Figure 5:
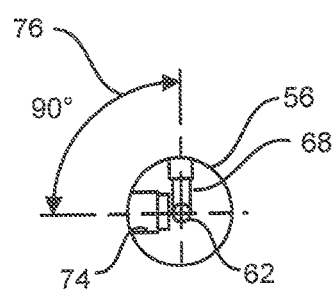
FIG. 5 is a sectional view taken along the line 5-5 in FIG. 3.

Body 54 includes a plurality of water outlet apertures 64, 66, 68, 70 and 72 extending between the upper surface 56 and the bore 62. Apertures 64-72 are equally spaced apart along surface 56, and when body 54 is a cylinder, apertures 64-72 extend radially from bore 62 to upper surface 56, as shown in FIG. 5.

Apertures 64-72 are tapped at surface 56 to form female threads which enable each aperture 64-72 to threadedly receive one of the spray nozzles 16-24, respectively. Each spray nozzle 16-24 is a conventional size 10, 25 degree, PVDF spray nozzle, such as those available from United States Plastic Corp. as part number 62658. Nozzles 16-24 are designed to spray water in a substantially fan-like profile, preferably with a spread of 25 degrees, and are orientated within apertures 64-72 so that one or more of nozzles 16-24 spray water upwardly from body 54 in a direction perpendicular to bore 62, and one or more of the nozzles 16-24 are orientated to spray water upwardly from body 54 in a direction parallel to bore 62. Preferably, nozzles 16-24 alternate between perpendicular and parallel orientations so that the fan-like profiles of water sprayed from nozzles 16, 20 and 24 are orientated in a parallel manner to bore 62, and the fan-like profiles of water sprayed from nozzles 18 and 22 are orientated in a perpendicular manner to bore 62.

Body 54 further includes an inlet opening 74 communicating between the water conveying passageway 44 of tube 12 and the longitudinal bore 62. As shown in FIGS. 3 and 4, inlet opening 74 is located midway between sides 58 and 60, and when body 54 is a cylinder, extends radially therein, and is disposed at a 90 degree angle 76 with respect to aperture 68. The outer end of inlet opening 74 is tapped to form female threads which enable body 54 to be threaded onto the outlet end 40 of the horizontal segment 38 of water delivery tube 12.

Axle members 30 and 32 are fixed to, and extend longitudinally from, the opposite sides 58 and 60, respectively, of the body 54 of manifold 14. Axle members 30 and 32 close and seal off the opposite ends of bore 62, which would otherwise be open, at sides 58 and 60 so that water is forced to flow into apertures 64-72 and through nozzles 16-24. Preferably, axle members 30 and 32 are in the form of conventional shoulder bolts which have collars at their outer ends, male threads at their inner ends, and smooth shanks extending therebetween. The opposite open ends of bore 62 are tapped to form female threads so that axle members 30 and 32 may be threadedly received therein, and thereby provide a water-tight seal.

Wheels 26 and 28 are rotatably mounted on the axle members 30 and 32, respectively, to provide mobility for the water rinsing apparatus 10. While the diameter of body 54 of manifold 14 is preferably about 2.25 inches, the diameter of each wheel 26 and 28 is preferably about 3 inches so that manifold 14 will ride comfortably above the ground in operation. Also, wheels 26 and 28 are preferably composed of nylon, which is substantially self-lubricating, so that rotation on axle members 30 and 32 is not inhibited.

In operation, one end of a garden hose is threaded onto connector 46 while the other end of the garden hose is connected to a source of water such as an outdoor house spigot. With valve 52 closed, the spigot is then opened, and the manifold 14 of the water rinsing apparatus 10 is positioned to be beneath the underbody of a vehicle. Once manifold 14 is positioned beneath a vehicle, valve 52 at the inlet end 36 of tube 12 is opened, and water begins spraying upwardly from nozzles 16-24. Manifold 14 may then be simultaneously reciprocated back and forth beneath a vehicle until the desired amount of rinsing and cleaning is performed. Once rinsing is completed, valve 52 is closed. This operation may then be repeated with another vehicle, or the spigot may be turned off and the garden hose disconnected from tube 12 of apparatus 10.

I claim:

1. A water rinsing apparatus for spraying water against an underbody of a vehicle, comprising:
    a longitudinally extending water delivery tube having a water inlet end, a water outlet end, and a water conveying passageway;
    a manifold connected to the outlet end of said tube and extending longitudinally in a normal direction with respect to said tube, said manifold having a longitudinal body having an upper surface extending between opposite sides, and each of the opposite sides of said body having threads formed thereon, said body having a longitudinal bore extending therethrough opening to both of said opposite sides, said longitudinal bore defining a longitudinal axis, a plurality of outlet apertures extending between said upper surface and said longitudinal bore, and an inlet opening communicating between said water conveying passageway and said longitudinal bore for distributing water from said water conveying passageway through said longitudinal bore to said apertures;
    a water spray nozzle disposed in each of said apertures, wherein one or more of said spray nozzles are orientated to spray water perpendicular to the longitudinal axis of the bore of said manifold, and one or more of said spray nozzles are orientated to spray water parallel to the longitudinal axis of the bore of said manifold;
    an axle member fixed to and extending from each of the opposite sides of said manifold, each axle member comprising a shoulder bolt having a cylindrical shank defining an outer cylindrical surface extending between threads formed at its inner end and a head formed at its opposite outer end, and the threads of one shoulder bolt engaging the threads formed at one side of the body of said manifold and the threads of another shoulder bolt engaging the threads formed at the opposite side of the body of said manifold to thereby seal off the longitudinal bore of said manifold at said opposite sides thereof, and said shoulder bolts extend longitudinally from the opposite sides of said manifold in a coaxial direction with said longitudinal axis of said bore so that each of said shoulder bolts define an axis of rotation that is coaxial with said longitudinal axis of said bore; and a wheel rotatably mounted on the cylindrical shank of each of said axle members, each of said wheels having an axis of rotation that is coaxial with the axis of rotation of said axle members as we as the longitudinal axis of said bore, each of said wheels including a hub composed of nylon, said hub having a central axial extending bolt-receiving opening defining a cylindrical inner surface that rotatably engages the outer cylindrical surface of the shank of said shoulder bolt so that said wheel rotates directly on the shank of said shoulder bolt.

2. The water rinsing apparatus of claim 1, wherein said water delivery tube has a substantially horizontal segment leading to said water outlet end and an angular segment leading to said water inlet end, said angular segment disposed at an obtuse angle with respect to said horizontal segment.

3. The water rinsing apparatus of claim 2, wherein said obtuse angle is 140 degrees to 150 degrees.

4. The water rinsing apparatus of claim 2, wherein said horizontal segment is longer than said angular segment.

5. The water rinsing apparatus of claim 1, wherein a garden hose connector is located at the water inlet end of said water delivery tube.

6. The water rinsing apparatus of claim 5, wherein a valve is located between the water inlet end of said water delivery tube and said garden hose connector to control the flow of water into the water conveying passageway.

7. The water rinsing apparatus of claim 1, wherein the water conveying passageway of said water delivery tube has a diameter, the longitudinal bore of said manifold has a diameter, and the diameter of said bore is less than the diameter of said passageway.

8. The water rinsing apparatus of claim 1, wherein said spray nozzles alternate between perpendicular and parallel orientations with respect to the longitudinal axis of said longitudinal bore.

9. The water rinsing apparatus of claim 1, wherein the longitudinal body of said manifold has a cylindrical shape.

10. The water rinsing apparatus of claim 1, wherein the apertures of said manifold extend radially between the upper surface of the body of said manifold and the longitudinal bore within the body of said manifold.

* * * * *